United States Patent
Yun (10) Patent No.: US 7,173,394 B2
(45) Date of Patent: Feb. 6, 2007

(54) APPARATUS AND METHOD FOR CONTROLLING INVERTER

(75) Inventor: Hong-Min Yun, Seoul (KR)

(73) Assignee: LS Industrial Systems Co., Ltd., Seoul (KR)

( * ) Notice: Subject to any disclaimer, the term of this patent is extended or adjusted under 35 U.S.C. 154(b) by 0 days.

(21) Appl. No.: 11/430,996

(22) Filed: May 10, 2006

(65) Prior Publication Data

US 2006/0255762 A1 Nov. 16, 2006

(30) Foreign Application Priority Data

May 11, 2005 (KR) ...................... 10-2005-0039481

(51) Int. Cl.
*H02P 27/04* (2006.01)
(52) U.S. Cl. ...................... 318/801; 318/632; 318/803
(58) Field of Classification Search ................ 318/801, 318/803, 632, 611
See application file for complete search history.

(56) References Cited

U.S. PATENT DOCUMENTS

| | | | |
|---|---|---|---|
| 5,825,642 A * | 10/1998 | Ishii et al. ................... 363/141 |
| 6,456,508 B1 * | 9/2002 | Namai et al. .................. 363/17 |
| 6,603,280 B2 * | 8/2003 | Notohara et al. ........... 318/500 |
| 2004/0124807 A1 * | 7/2004 | Nakata et al. .............. 318/801 |
| 2004/0228150 A1 * | 11/2004 | Sato ............................ 363/23 |
| 2006/0119311 A1 | 6/2006 | Lee |

* cited by examiner

*Primary Examiner*—Rina Duda
(74) *Attorney, Agent, or Firm*—Greenblum & Bernstein, P.L.C.

(57) ABSTRACT

An apparatus and method for controlling an inverter are disclosed to allow an inverter to provide a stable output voltage to a motor regardless of a change in a DC input voltage. A difference value between a reference voltage according to a predetermined rated voltage of a motor and a DC voltage of the inverter is obtained, a ratio of an output command frequency to a predetermined reference frequency is applied to the difference value to obtain a compensation output voltage value, a final compensation output voltage value is obtained by compensating the detected DC input voltage value with the compensation output voltage, and an output voltage of the final compensation output voltage value to the motor by the inverter. Thus, the stable output voltage of the inverter can be provided to the motor regardless of the change in the input voltage.

4 Claims, 5 Drawing Sheets

APPARATUS AND METHOD FOR CONTROLLING INVERTER

BACKGROUND OF THE INVENTION

1. Field of the Invention

The present invention relates to an apparatus and method for controlling an inverter and, more particularly, to an apparatus and method for controlling an inverter capable of providing a stable AC output voltage to an induction motor regardless of a variation of a DC input voltage.

2. Description of the Prior Art

In a system having an inverter and driving a motor by using the inverter, an input voltage supplied to the inverter is a DC voltage obtained by rectifying an AC current from a commercial AC power source by a rectifying circuit and then smoothing it by a condenser. It is also called a DC link voltage. The DC input voltage is changed as the voltage of the general AC power is frequently changed according to industrial activity factors (day time during which factories are operated and night time during which factories are not operated) or seasonal factors (the summer season during which air conditioners are actively operated and other seasons).

The change in the DC input voltage may break a current path to the inverter due to an over voltage trip (in case of an over voltage) or bring about a situation that a motor cannot be started (in case of under voltage).

That is, when the input voltage of the inverter is changed, an output voltage is changed at the same ratio, and when the input voltage exceeds a rated voltage where a breaker is tripped, a circuit breaker connected with a power circuit of the inverter is tripped to protect the inverter and the motor to break power supply to the inverter. Conversely, if the input voltage is lower than allowable range of the rated voltage, the motor cannot be started by failing to generate a motor start torque.

Thus, in order to compensate the input voltage lower than the allowable range of the rated voltage, a technique of providing a boost voltage set by a user to the inverter is proposed. Namely, if the DC input voltage is an under voltage, the boost voltage is set as a positive (+) voltage, whereas if the DC input voltage is an over voltage, the boost voltage is set as a negative (−) voltage.

Figure 1:
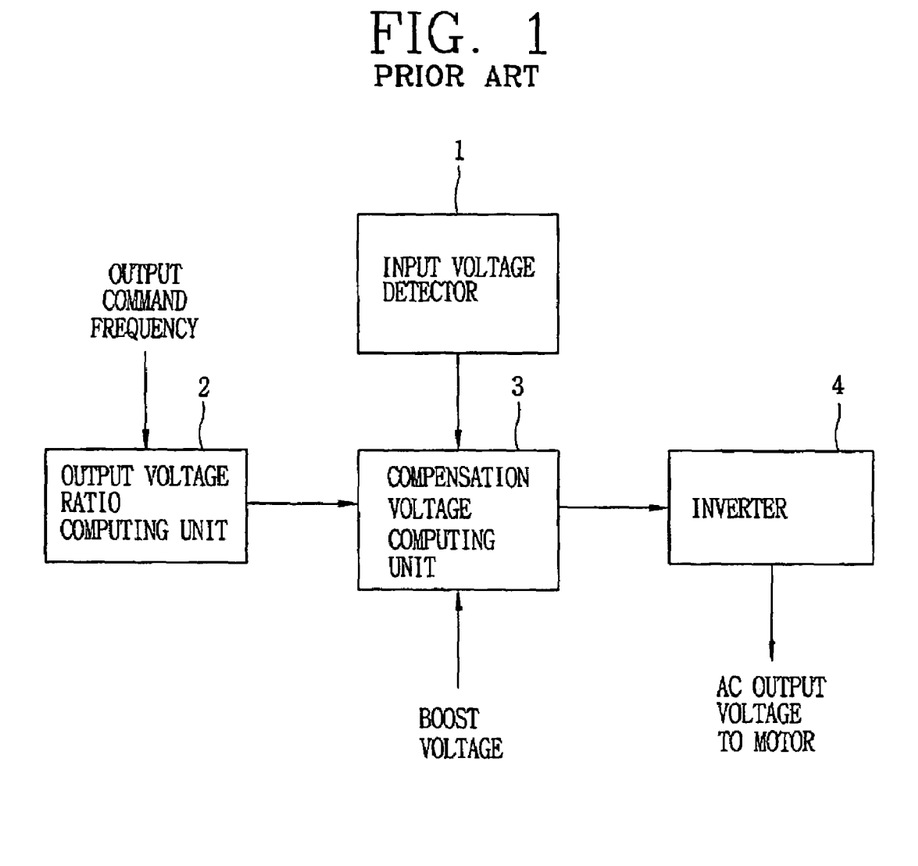
FIG. 1 is a schematic block diagram showing an inverter controlling apparatus in accordance with a prior art.

One example of the prior art will be described with reference to FIG. 1. As shown in FIG. 1, the prior art inverter controlling apparatus includes an input voltage detector 1 for detecting a DC input voltage inputted to an inverter; an output voltage ratio computing unit 2 for calculating a ratio of an output command frequency to a reference frequency and determining a ratio of an output voltage to an input voltage; a compensation voltage computing unit 3 for obtaining a compensation voltage value by adding a predetermined boost voltage value to a voltage value obtained by multiplying the ratio provided by the output voltage ratio computing unit 2 to the DC input voltage value provided by the input voltage detector 1 and outputting it; and the inverter 4 for outputting an output voltage of the compensation voltage value received from the compensation voltage computing unit 3 to a motor.

The operation of the prior art inverter controlling apparatus constructed as described above will be explained.

First, the output command frequency of the inverter 4 is outputted from a central processing unit to the output voltage ratio computing unit 2 according to a pre-set program.

Then, the output voltage ratio computing unit 2 calculates a ratio of an output command frequency, e.g., 30 Hz, to a reference frequency, e.g., 60 Hz (Herz), which has been predetermined and stored, determines the result, ½, namely, 50%, as a ratio of the output voltage to the input voltage of the inverter 4, and outputs it.

The input voltage detector 1 detects a value of voltage (also called the DC link voltage as mentioned above) across a condenser (not shown) of an input power circuit (not shown) of the inverter 4 as an input voltage value, and provides it. Herein, the input voltage detector 1 can be substantially formed as a potential transformer.

As above mentioned, in order to compensate the over voltage or the under voltage of the input voltage, the positive (+) or negative (−) boost voltage, which has been previously set and stored in the inverter controlling apparatus by an input unit such as a program loader by a user, can be provided in the compensation voltage computing unit 3 by the central processing unit.

The compensation voltage computing unit 3 calculates a compensation voltage value by multiplying the ratio provided from the output voltage ratio computing unit 2 to the input voltage value provided from the input voltage detector 1, and adds the pre-set boost voltage value to the obtained compensation voltage value to thereby obtain a final compensation voltage value and output it to the inverter 4.

Then, the inverter 4 outputs an AC output voltage according to the compensation voltage value provided from the compensation voltage computing unit 3 to the motor.

However, in the prior art, if a present input voltage becomes smaller than the input voltage when the boost voltage is set, the output voltage of the inverter is accordingly reduced. Then, the start torque is not sufficient to start the motor.

In addition, when the current input voltage becomes higher than the input voltage when the boost voltage is set, the circuit breaker performs the over current trip operation to cut off power supply to the motor.

Meanwhile, in case of a low speed operation, especially when the motor is started, even when the input voltage of the inverter is changed by merely 10%, the current flowing at the motor is changed by more than 10%. Thus, if the present input voltage is changed greater or smaller than the input voltage when the boost voltage is set, the problem of over current trip or the start torque deficiency occurs.

In addition, in order to avoid the problem, in the prior art, the user must re-set the boost voltage value frequently.

BRIEF DESCRIPTION OF THE INVENTION

An object of the present invention is to provide an apparatus for controlling an inverter capable of automatically outputting a stable output voltage of an inverter to a motor even when a DC input voltage of the inverter is changed.

Another object of the present invention is to provide an apparatus for controlling an inverter capable of selecting automatic compensation or a manual compensation of a change in a DC input voltage.

Still another object of the present invention is to provide a method for controlling an inverter capable of outputting a stable output voltage of an inverter to a motor even when a DC input voltage of the inverter is changed.

Yet another object of the present invention is to provide a method for controlling an inverter capable of selecting automatic compensation of manual compensation of a change in a DC input voltage.

The above object of the present invention can be accomplished in whole or in parts, by providing an apparatus for controlling an inverter according to the invention comprising:

an inverter for converting an inputted DC voltage into an AC output voltage for driving a motor and providing it;

an input voltage detector for detecting the DC input voltage inputted to the inverter; an output voltage ratio computing unit for determining a ratio of an output voltage value to the detected DC input voltage value by calculating a ratio of an output command frequency to a reference frequency;

a reference voltage generator for providing a reference voltage value depending on a predetermined motor rated voltage value;

a difference voltage computing unit for calculating a difference value between the reference voltage value provided by the reference voltage generator and the DC input voltage value provided by the input voltage detector, and providing it;

a compensation voltage computing unit for obtaining a compensation voltage value by multiplying the ratio provided by the output voltage ratio computing unit to the difference voltage value provided by the difference voltage computing unit, obtaining a final compensation voltage value by adding the obtained compensation voltage value to the DC input voltage value provided from the input voltage detector, and providing it;

and the inverter for outputting an output voltage of the final compensation voltage value provided from the compensation voltage computing unit to the motor.

The above object of the present invention can be accomplished in whole or in parts, by providing an apparatus for controlling an inverter according to the invention comprising:

an inverter for converting an inputted DC voltage into an AC output voltage for driving a motor and providing it;

an input voltage detector for detecting the DC input voltage inputted to the inverter;

an output voltage ratio computing unit for calculating a ratio of an output command frequency to a reference frequency, and determining a ratio of an output voltage value to the detected DC input voltage value;

a first compensation voltage computing unit for obtaining a first compensation voltage value by adding a predetermined boost voltage value to a voltage value obtained by multiplying a ratio provided by the output voltage ratio computing unit to the DC input voltage value provided by the input voltage detector, and providing the first compensation voltage value;

a reference voltage generator for providing a reference voltage value depending on a predetermined motor rated voltage value; a difference voltage computing unit for calculating a difference value between the reference voltage value provided by the reference voltage generator and the DC input voltage value provided by the input voltage detector, and providing it;

a second compensation voltage computing unit for obtaining a compensation voltage value by multiplying the ratio provided by the output voltage ratio computing unit to the difference voltage value provided by the difference voltage computing unit, obtaining a second compensation voltage value by adding the obtained compensation voltage value to the DC input voltage value provided from the input voltage detector, and providing it;

a compensation voltage selector for selectively providing the first compensation voltage value provided from the first compensation voltage computing unit and the second compensation voltage value provided from the second compensation voltage computing unit to the inverter according to setting of a predetermined selection;

and the inverter for outputting an output voltage of the first compensation voltage value or an output voltage of the second compensation voltage value provided from the compensation voltage selector, to the motor.

The above object of the present invention can be accomplished in whole or in parts by providing a method according to the invention for controlling an inverter comprising:

detecting a DC input voltage value of an inverter; calculating a ratio of an output command frequency to a reference frequency and determining a ratio of an output voltage value to the detected DC input voltage value;

generating a reference voltage depending on a predetermined motor rated voltage value;

calculating a difference value between the calculated reference voltage and the DC input voltage value;

obtaining a compensation voltage value by multiplying a ratio of an output voltage value to the determined DC input voltage value to the calculated difference value, and adding the obtained compensation voltage value to the DC input voltage value to obtain a final compensation voltage value;

and providing an output voltage of the final compensation voltage value to the motor.

The above object of the present invention can be accomplished in whole or in parts by providing a method for controlling an inverter comprising: the steps of detecting a DC input voltage value of an inverter;

calculating a ratio of an output command frequency to a reference frequency and determining a ratio of an output voltage value to the detected DC input voltage value;

multiplying a ratio of the output voltage value to the determined DC input voltage value to the DC input voltage value, to obtain a value, to which a predetermined boost voltage value is added to obtain a first compensation voltage value;

generating a reference voltage depending on a predetermined motor rated voltage value;

calculating a difference value between the generated reference voltage and the DC input voltage value;

obtaining a compensation voltage value by multiplying a ratio of an output voltage value to the determined DC input voltage value to the calculated difference value, and adding the obtained compensation voltage value to the DC input voltage value to obtain a second compensation voltage value;

and providing an output voltage of the first compensation voltage value or an output voltage of the second compensation voltage value to a motor according to setting of a predetermined selection.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

The inverter controlling apparatus in accordance with the present invention will be described with reference to the accompanying drawings.

Figure 2:
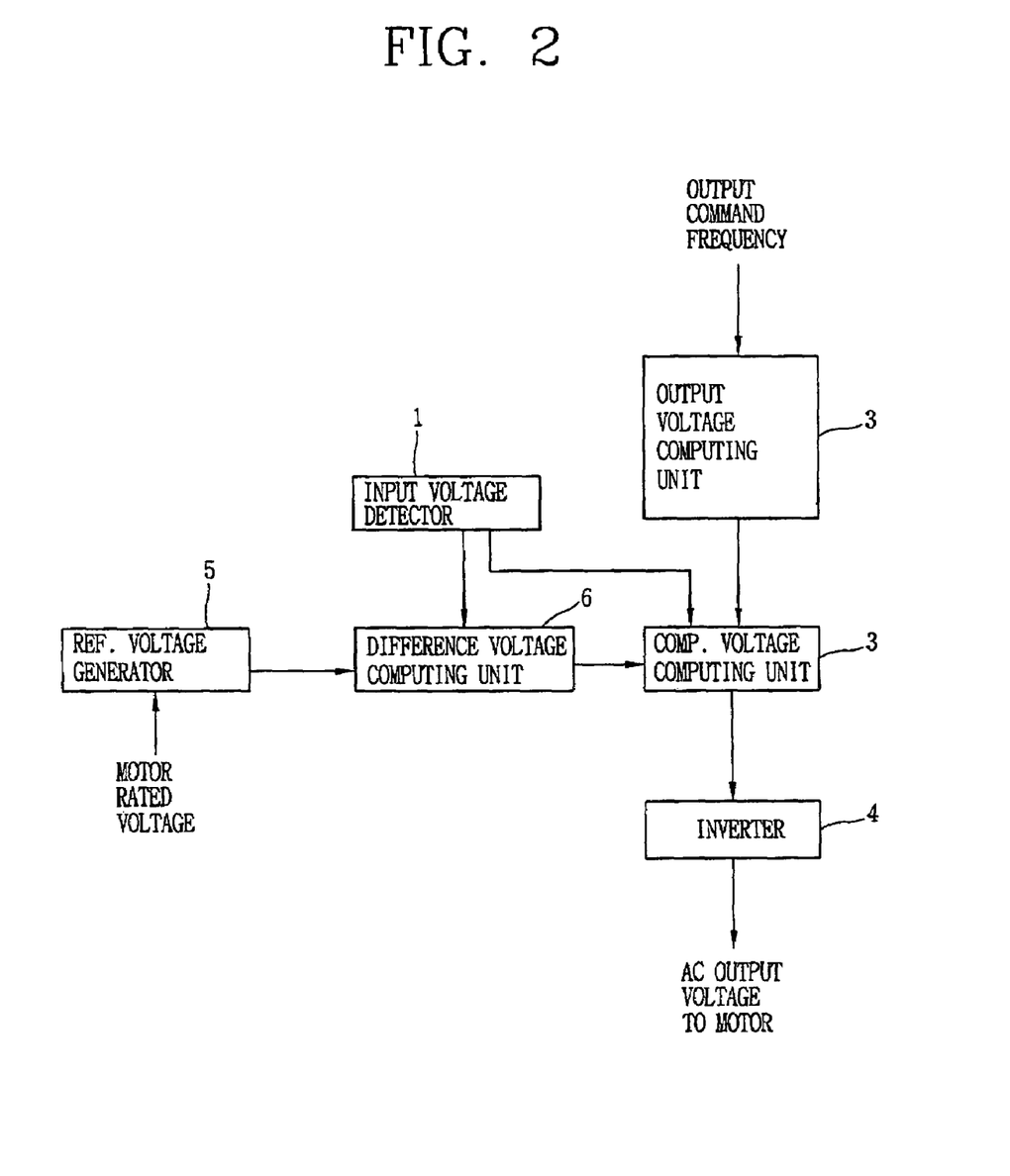
FIG. 2 is a schematic block diagram of an inverter controlling apparatus in accordance with one embodiment of the present invention.

FIG. 2 is a schematic block diagram of an inverter controlling apparatus in accordance with one embodiment of the present invention.

As shown in FIG. 2, the inverter controlling apparatus according to one embodiment of the present invention comprises an inverter 4 for converting an inputted DC voltage into an AC output voltage for driving a motor and providing it; an input voltage detector 1 for detecting the DC input voltage inputted to the inverter 4; an output voltage ratio computing unit 2 for determining a ratio of an output voltage value to the detected DC input voltage value by calculating a ratio of an output command frequency to a reference frequency; a reference voltage generator 5 for providing a reference voltage value depending on a predetermined motor rated voltage value; a difference voltage computing unit 6 for calculating a difference value between the reference voltage value provided by the reference voltage generator 5 and the DC input voltage value provided by the input voltage detector 1, and providing it; a compensation voltage computing unit 3 for obtaining a compensation voltage value by multiplying the ratio provided by the output voltage ratio computing unit 2 to the difference voltage value provided by the difference voltage computing unit 6, obtaining a final compensation voltage value by adding the obtained compensation voltage value to the DC input voltage value provided from the input voltage detector, and providing it; and the inverter 4 for outputting an output voltage of the final compensation voltage value provided from the compensation voltage computing unit 3 to the motor.

Likewise as in the prior art, the input voltage detector 1 can be formed as a potential transformer connected across a condenser (not shown) of a smoothing circuit of a power circuit of the inverter.

Herein, the output voltage ratio computing unit 2, the compensation voltage computing unit 3 and the difference voltage computing unit 6 can be implemented as a storage unit for storing an actual processing program and a central processing unit for reading out the processing program from the storage unit and executing a corresponding calculation.

The reference voltage generator 5 is a set value memory unit for storing a reference voltage that is determined and set by a user depending on a value of a rated voltage or in consideration of upper and lower allowable limit voltage values for the rated voltage value.

The inverter 4 is a general inverter and may include gate control switching elements such as an insulated gate bipolar transistor (IGBT) provided by pairs for each phase of a three-phase AC motor.

The operation of the inverter controlling apparatus according to one embodiment of the present invention will now be described.

First, an output command frequency of the inverter 4 is provided from the central processing unit (not shown) to the output voltage ratio computing unit 2 according to a previously stored program.

Then, the output voltage ratio computing unit 2 calculates a ratio of an output command frequency, e.g., 30 Hz, to a reference frequency, e.g., 60 Hz (Herz), which has been previously determined and stored, determines the result, ½, namely, 50%, as a ratio of the output voltage to the input voltage of the inverter 4, and provides it.

The input voltage detector 1 detects a value of the voltage (also called the DC link voltage as mentioned above) across a condenser (not shown) of an input power circuit (not shown) of the inverter 4 as an input voltage value, and provides it.

The reference voltage generator 5 provides a reference voltage value of a value of a rated voltage set by the user and stored in a memory (not shown) or a value in consideration of an allowable upper or lower limit voltage value for the rated voltage.

The difference voltage computing unit 6 calculates a difference value between a DC input voltage value provided from the input voltage detector 1 and the reference voltage value provided from the reference voltage generator 5 and provides a corresponding result value.

The compensation voltage computing unit 3 obtains a compensation voltage value by multiplying the ratio provided from the output voltage ratio computing unit 2 to the difference voltage provided from the difference voltage computing unit 6, adds the obtained compensation voltage value to an input voltage value provided from the input voltage detector 1 to obtain a final compensation voltage value, and provides the final compensation voltage value to the inverter 4.

Then, the inverter 4 provides an AC output voltage according to the final compensation voltage value provided from the compensation voltage computing unit 3 to a motor (not shown) to drive the motor.

In the inverter controlling apparatus in accordance with one embodiment of the present invention, the reference voltage value according to the rated voltage of the motor and the DC input voltage supplied to the inverter are always compared, and if there is a difference therebetween, the input voltage is compensated with a compensation voltage according to the difference and provided to the inverter.

Accordingly, although there is a change in the input voltage, the user does not need to re-set a boost voltage and the stable output voltage of the inverter can be automatically provided to the motor.

Result data obtained through an experimentation that can support the effects of the present invention will now be described.

First, conditions in the experimentation are as follows.

Namely, under the conditions that a reference frequency was 60 Hz, a motor rated voltage was 200 Volts and an output command frequency was given 15 Hz, 30 Hz and 45 Hz, respectively, results obtained by measuring the output voltage and output current of the inverter are as shown in following table.

| OPERAT. FREQ. | CHANGE OF INPUT VOLTAGE | MEASURED VALUE | | | | | |
|---|---|---|---|---|---|---|---|
| | | OUTPUT VOLTAGE | | | OUTPUT CURRENT | | |
| | | BEFORE CHANGE | AFTER CHANGE | CHANGE RATIO | BEFORE CHANGE | AFTER CHANGE | CHANGE RATIO |
| 15 Hz | 100% → −15% | 62 | 62 | 0 | 24 | 24 | 0 |
| | −15% → 100% | 62 | 62 | 0 | 24 | 24.3 | −1.235 |
| | 100% → +10% | 62 | 62 | 0 | 24 | 24.4 | −1.639 |
| | −15% → 10% | 62 | 62 | 0 | 24 | 24.4 | −1.639 |
| 30 Hz | 100% → −15% | 116 | 116 | 0 | 24 | 24 | 0 |
| | −15% → 100% | 116 | 116 | 0 | 24 | 24 | 0 |
| | 100% → +10% | 116 | 116 | 0 | 24 | 24.1 | −0.415 |
| | −15% → 10% | 116 | 116 | 0 | 24 | 24.1 | −0.415 |
| 45 Hz | 100% → −15% | 170 | 170 | 0 | 24 | 24.7 | −2.834 |
| | −15% → 100% | 159 | 165 | −3.6 | 24 | 23.9 | 0.4184 |
| | 100% → +10% | 170 | 170 | 0 | 24 | 24.1 | −0.415 |
| | −15% → 10% | 159 | 165 | −3.6 | 24 | 24.1 | −0.415 |

In the table, the change of the input voltage '100%→−15%' means that the input voltage was changed from the 200 volts (100%) to 170 volts (85%) (namely, 15% was reduced), and '−15→100%' means that the input voltage was changed from 170 volts (85%) to 200 volts (100%).

An operation frequency means an output command frequency of the inverter.

The unit of the output voltage is volts, the unit of change ratio is % and the unit of the output current is ampere.

In the table, it is noted that when the output command frequency was 15 Hz and 30 Hz, although the input voltages are changed up to 15%, there is no change in the output voltages of the inverter.

Also, it is noted that the output currents are changed by below 3% over the change of the input voltages, exhibiting stable input voltage change to output characteristics.

Figure 3:
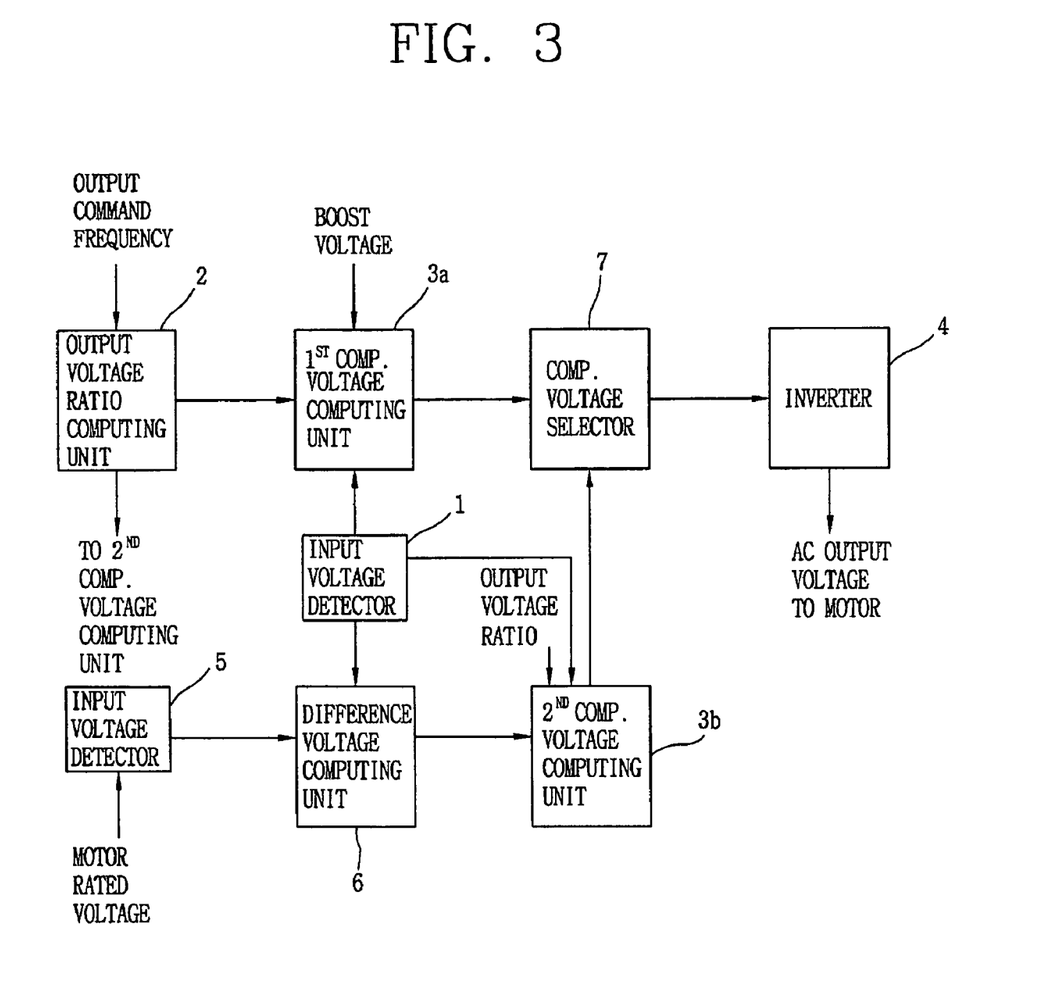
FIG. 3 is a schematic block diagram of an inverter controlling apparatus in accordance with another embodiment of the present invention.

An inverter controlling apparatus in accordance with another embodiment of the present invention will now be described with reference to FIG. 3. FIG. 3 is a schematic block diagram of an inverter controlling apparatus in accordance with another embodiment of the present invention.

The inverter controlling apparatus according another embodiment of the present invention comprises an inverter 4 for converting an inputted DC voltage into an AC output voltage for driving a motor and providing it; an input voltage detector 1 for detecting the DC input voltage inputted to the inverter; an output voltage ratio computing unit 2 for calculating a ratio of an output command frequency to a reference frequency, and determining a ratio of an output voltage value to the detected DC input voltage value; a first compensation voltage computing unit 3a for obtaining a first compensation voltage value by adding a predetermined boost voltage value to a voltage value obtained by multiplying a ratio provided by the output voltage ratio computing unit 2 to the DC input voltage value provided by the input voltage detector 1, and providing the first compensation voltage value; a reference voltage generator 5 for providing a reference voltage value depending on a predetermined motor rated voltage value; a difference voltage computing unit 6 for calculating a difference value between the reference voltage value provided by the reference voltage generator 5 and the DC input voltage value provided by the input voltage detector 1, and providing it; a second compensation voltage computing unit 3b for obtaining a compensation voltage value by multiplying the ratio provided by the output voltage ratio computing unit 2 to the difference voltage value provided by the difference voltage computing unit 6, obtaining a second compensation voltage value by adding the obtained compensation voltage value to the DC input voltage value provided from the input voltage detector 1; a compensation voltage selector 7 for selectively providing the first compensation voltage value provided from the first compensation voltage computing unit 3a or the second compensation voltage value provided from the second compensation voltage computing unit 3b to the inverter according to setting of a predetermined selection; and the inverter 4 for outputting an output voltage of the first compensation voltage value or an output voltage of the second compensation voltage value provided from the compensation voltage selector 7, to the motor.

Likewise as in the prior art and as in the first embodiment of the present invention, the input voltage detector 1 can be formed as a potential transformer connected across a condenser (not shown) of a smoothing circuit of a power circuit of the inverter.

Herein, the output voltage ratio computing unit 2, the first and second compensation voltage computing units 3a and 3b, the difference voltage computing unit 6, and the compensation voltage selector 7 can be implemented as a storage unit for storing an actual processing program and a central processing unit for reading out the processing program from the storage unit and executing a corresponding calculation likewise as in the first embodiment of the present invention.

The reference voltage generator 5 is a set value memory unit for storing a reference voltage that is determined and set by a user depending on a value of a rated voltage or in consideration of upper and lower allowable limit voltage values for the rated voltage value.

Likewise as in the prior art and as in the first embodiment of the present invention, the inverter 4 is a general inverter and may include gate control switching elements such as an insulated gate bipolar transistor (IGBT) provided by pairs for each phase of a three-phase AC motor.

The operation of the inverter controlling apparatus according to another embodiment of the present invention will now be described.

First, an output command frequency of the inverter 4 is provided from the central processing unit (not shown) to the output voltage ratio computing unit 2 according to a previously stored program.

Then, the output voltage ratio computing unit 2 calculates a ratio of an output command frequency, e.g., 30 Hz, to a reference frequency, e.g., 60 Hz (Hertz), which has been predetermined and stored, determines the result, ½, namely, 50%, as a ratio of the output voltage to the input voltage of the inverter 4, and provides it.

The input voltage detector 1 detects a value of the voltage (also called the DC link voltage as mentioned above) across a condenser (not shown) of an input power circuit (not shown) of the inverter 4 as an input voltage value, and provides it.

The reference voltage generator 5 provides a reference voltage value of a value of a rated voltage set by the user and stored in a memory (not shown) or a value in consideration of an allowable upper or lower limit voltage value for the rated voltage.

The difference voltage computing unit 6 calculates a difference value between a DC input voltage value provided from the input voltage detector 1 and the reference voltage value provided from the reference voltage generator 5 and provides a corresponding result value.

The second compensation voltage computing unit 3b obtains a compensation voltage value by multiplying the ratio provided from the output voltage ratio computing unit 2 to the difference voltage provided from the difference voltage computing unit 6, adds the obtained compensation voltage value to an input voltage value provided from the input voltage detector 1 to obtain a second compensation voltage value, and provides the second compensation voltage value to the compensation voltage selector 7.

In order to compensate an over voltage or an under voltage of an input voltage, a positive (+) or negative (−) boost voltage, which has been previously set and stored in a storage unit such as a memory (not shown) by an input unit such as a key switch, a touch screen switch, a program loader or the like, by a user, is provided to the first compensation voltage computing unit 3a by a central processing unit (not shown).

The first compensation voltage computing unit 3a calculates a compensation voltage value by multiplying the ratio provided from the output voltage ratio computing unit 2 to an input voltage value provided from the input voltage detector 1, adds a pre-set boost voltage value as provided to the calculated compensation voltage value to obtain a final first compensation voltage value, and provides the first compensation voltage value to the compensation voltage selector 7.

The compensation voltage selector 7 provides the first compensation voltage value provided from the first compensation voltage computing unit 3a or the second compensation voltage value provided from the second compensation voltage computing unit 3b to the inverter 4 according to selection information of the compensation voltage value, which has been previously set and stored in the storage unit such as the memory (not shown) by the input unit such as the key switch, the touch screen switch, the program loader, and the like, by user.

The inverter 4 provides an AC output voltage of the first compensation voltage value or an AC output voltage of the second compensation voltage value provided from the compensation voltage selector 7 to the motor to drive the motor.

According to the inverter controlling apparatus in accordance with another embodiment of the present invention, the user can provide an inverter output command voltage value which has been automatically compensated according to a change in the input voltage selectively to the inverter, or the user can provide the inverter output command voltage value which has been compensated with the manually set boost voltage to the inverter.

When the user has no idea of a rated voltage of a general motor, the user can selectively set the boost voltage manually.

In the case where the user selectively sets the boost voltage manually, likewise as in the prior art, likewise as in the prior art, an output voltage is not stable but can be changed to cause a phenomenon that the motor may not be started or the over current trip can occur.

Figure 4:
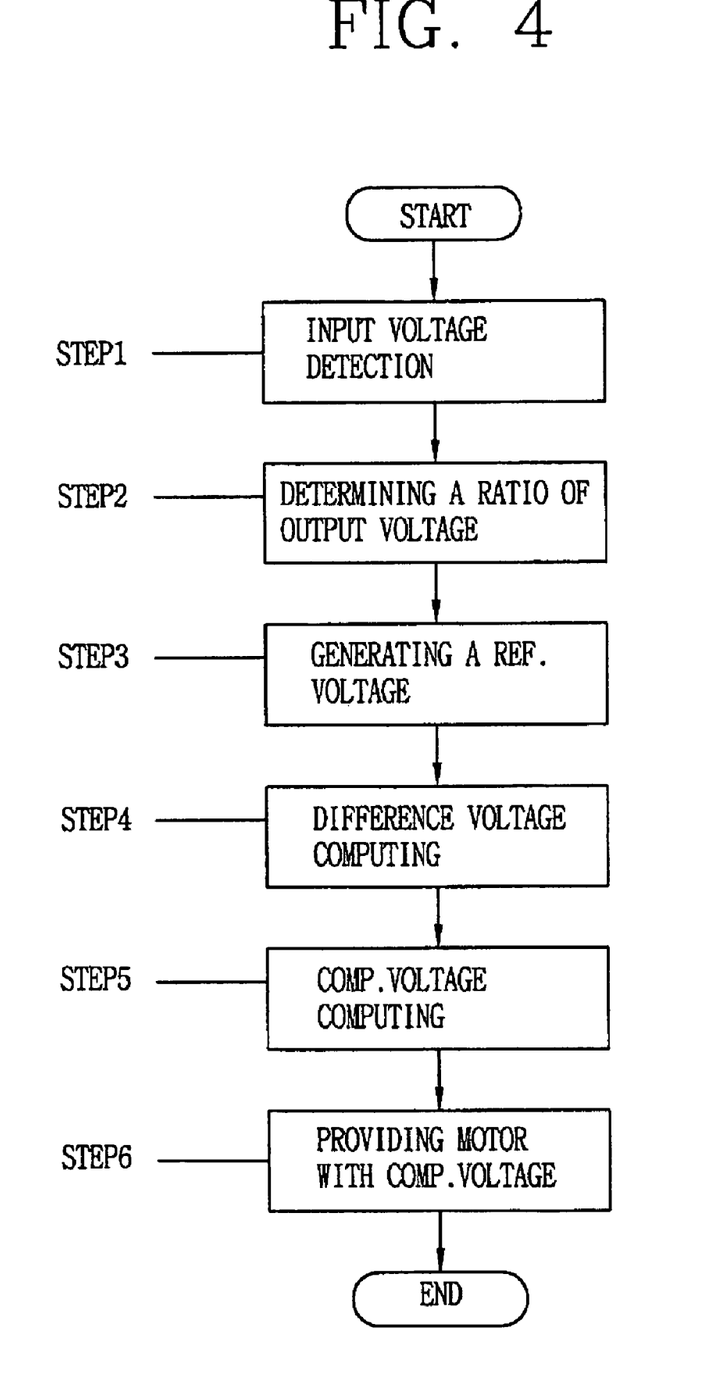
FIG. 4 is a flow chart illustrating the processes of an inverter controlling method in accordance with one embodiment of the present invention.

An inverter controlling method according to one embodiment of the present invention will now be described with reference to FIG. 4. FIG. 4 is a flow chart illustrating the processes of an inverter controlling method in accordance with one embodiment of the present invention.

Preferably, the inverter controlling method according to one embodiment of the present invention can be implemented by the inverter controlling apparatus according to the first embodiment of the present invention as shown in FIG. 2.

The inverter controlling method according to one embodiment of the present invention comprises the following steps:

detecting a DC input voltage value of an inverter (step S1);

calculating a ratio of an output command frequency to a reference frequency and determining a ratio of an output voltage value to the detected DC input voltage value (step S2);

generating a reference voltage depending on a predetermined motor rated voltage value (step S3);

calculating a difference value between the calculated reference voltage and the DC input voltage value (step S4);

obtaining a compensation voltage value by multiplying the determined ratio to the calculated difference value and adding the obtained compensation voltage value to the DC input voltage value to obtain a final compensation voltage value (step S5);

and providing an output voltage of the final compensation voltage value to the motor (step S6).

In the step S1, an input voltage of the inverter is detected by the input voltage detector 1 as shown in FIG. 2. Namely, the input voltage detector 1 detects a value of the voltage (also called the DC link voltage as mentioned above) across a condenser (not shown) of an input power circuit (not shown) of the inverter 4 as an input voltage value.

In the step S2, the output voltage ratio computing unit 2 as shown in FIG. 2 calculates a ratio of an output command frequency, e.g., 30 Hz, to a reference frequency, e.g., 60 Hz (Herz), which has been previously determined and stored, determines the result, ½, namely, 50%, as a ratio of the output voltage to the input voltage of the inverter 4.

In the step S3, the reference voltage generator 5 as shown in FIG. 2 provides a reference voltage value of a value of a rated voltage set by the user and stored in a memory (not shown) or a value in consideration of an allowable upper or lower limit voltage value for the rated voltage.

In the step S4, the difference voltage computing unit 6 as shown in FIG. 2 calculates a difference value between a DC input voltage value provided from the input voltage detector 1 and the reference voltage value provided from the reference voltage generator 5 and provides a corresponding result value.

In the step S5, the compensation voltage computing unit 3 as shown in FIG. 2 obtains a compensation voltage value by multiplying the ratio provided from the output voltage ratio computing unit 2 to the difference voltage provided from the difference voltage computing unit 6, adds the obtained compensation voltage value to an input voltage value provided from the input voltage detector 1 to obtain a final compensation voltage value, and provides the final compensation voltage value to the inverter 4.

In the step S6, the inverter 4 as shown in FIG. 2 provides an AC output voltage according to the final compensation voltage value provided from the compensation voltage computing unit 3 to a motor (not shown) to drive the motor.

Figure 5:
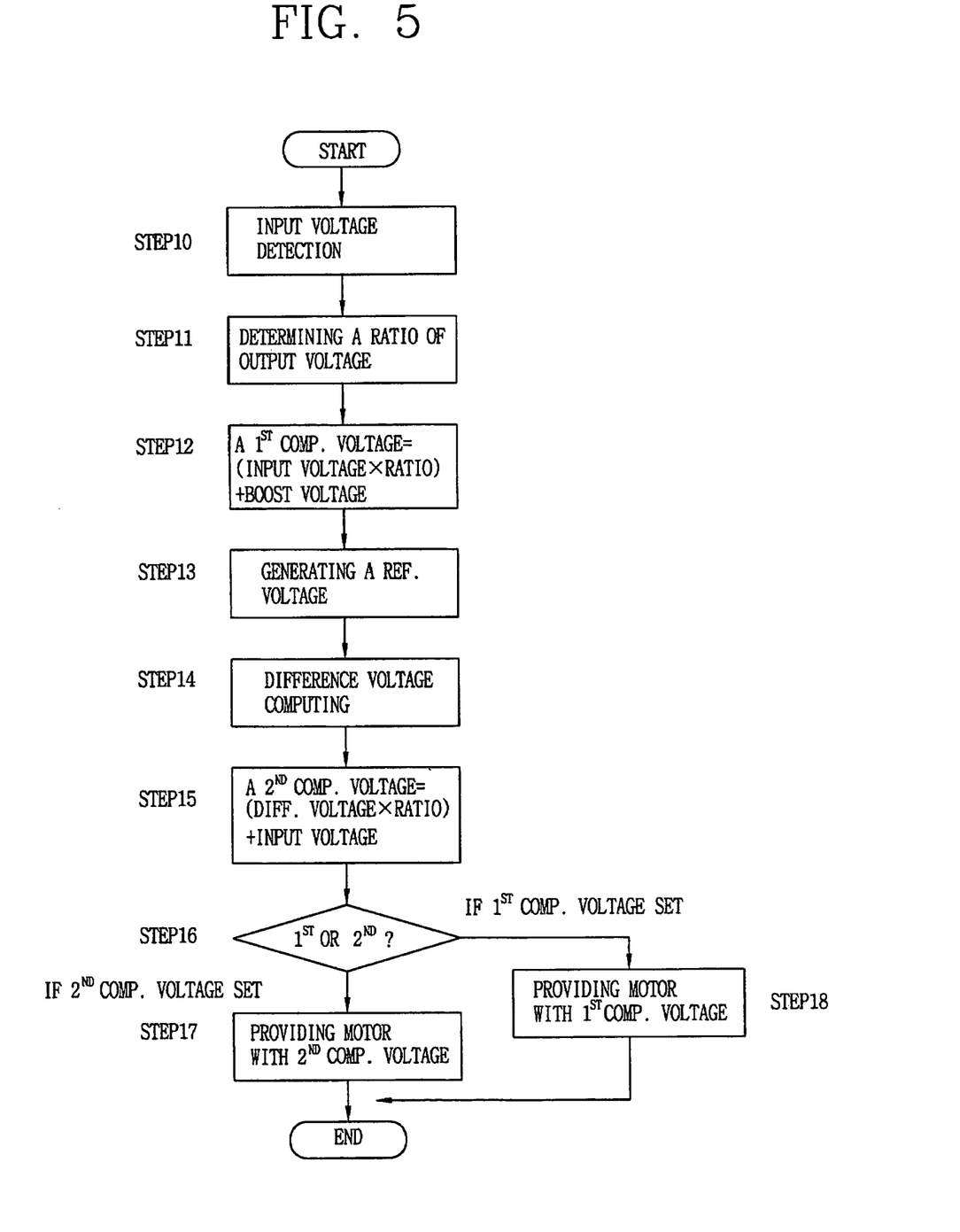
FIG. 5 is a flow chart illustrating the processes of an inverter controlling method in accordance with another embodiment of the present invention.

An inverter controlling method according to another embodiment of the present invention will be described with reference to FIG. 5. FIG. 5 is a flow chart illustrating the processes of an inverter controlling method in accordance with another embodiment of the present invention.

Preferably, the inverter controlling method according to another embodiment of the present invention can be implemented by the inverter controlling apparatus according to the second embodiment of the present invention as shown in FIG. 3.

The inverter controlling method according to another embodiment of the present invention comprises: the steps of detecting a DC input voltage value of an inverter (step S10);

calculating a ratio of an output command frequency to a reference frequency and determining a ratio of an output voltage value to the detected DC input voltage value (step S11);

multiplying a ratio of the output voltage value to the determined DC input voltage value to the DC input voltage value, to obtain a value, to which a predetermined boost voltage value is added to obtain a first compensation voltage value (step S12);

generating a reference voltage depending on a predetermined motor rated voltage value (step S13);

calculating a difference value between the generated reference voltage and the DC input voltage value (step S14);

obtaining a compensation voltage value by multiplying a ratio of an output voltage value to the determined DC input voltage value to the calculated difference value, and adding the obtained compensation voltage value to the DC input voltage value to obtain a second compensation voltage value (step S15);

and providing an output voltage of the first compensation voltage value or an output voltage of the second compensation voltage value to a motor according to setting of a predetermined selection (steps S17 or S18).

In the step S10, an input voltage of the inverter is detected by the input voltage detector 1 as shown in FIG. 3. Namely, the input voltage detector 1 detects a value of the voltage (also called the DC link voltage as mentioned above) across a condenser (not shown) of an input power circuit (not shown) of the inverter 4 as an input voltage value.

In the step S11, the output voltage ratio computing unit 2 as shown in FIG. 3 calculates a ratio of an output command frequency, e.g., 30 Hz, to a reference frequency, e.g., 60 Hz (Herz), which has been previously determined and stored, determines the result, ½, namely, 50%, as a ratio of the output voltage to the input voltage of the inverter 4.

In the step S12, the first compensation voltage computing unit 3a as shown in FIG. 3 calculates a compensation voltage value by multiplying the ratio provided from the output voltage ratio computing unit 2 to the input voltage value provided from the input voltage detector 1, adds a pre-set boost voltage value as provided to the compensation voltage value to obtain a final first compensation voltage value, and provides the first compensation voltage value.

In the step S13, the reference voltage generator 5 as shown in FIG. 3 provides a reference voltage value of a value of a rated voltage set by the user and stored in a memory (not shown) or a value in consideration of an allowable upper or lower limit voltage value for the rated voltage.

In the step S14, the difference voltage computing unit 6 as shown in FIG. 3 calculates a difference value between a DC input voltage value provided from the input voltage detector 1 and the reference voltage value provided from the reference voltage generator 5 and provides a corresponding result value.

In the step S15, the second compensation voltage computing unit 3b as shown in FIG. 3 obtains a compensation voltage value by multiplying the ratio provided from the output voltage ratio computing unit 2 to the difference voltage provided from the difference voltage computing unit 6, adds the obtained compensation voltage value to an input voltage value provided from the input voltage detector 1 to obtain a second compensation voltage value, and provides the second compensation voltage value to the compensation voltage selector 7.

In the step S16, the compensation voltage selector 7 as shown in FIG. 3 provides the first compensation voltage value provided from the first compensation voltage computing unit 3a or the second compensation voltage value provided from the second compensation voltage computing unit 3b to the inverter 4 according to selection information of the compensation voltage value which has been previously set and stored in a storage unit such as the memory (not shown) by an input unit by the user.

Then, if the first compensation voltage value is provided from the compensation voltage selector 7, the inverter 4 as shown in FIG. 3 provides an AC output voltage of the first compensation voltage value to the motor (step S18), whereas if the second compensation voltage value is provided from the compensation voltage selector 7, the inverter 4 provides an AC output voltage of the second compensation voltage value to the motor (step S17).

As so far described, the inverter controlling apparatus and method according to one embodiment of the present invention has the advantages that although the input voltage is changed, the user does not need to re-set the boost voltage at each time and the stable output voltage of the inverter can be automatically provided to the motor.

In addition, the inverter controlling apparatus and method according to another embodiment of the present invention has the advantages that the user can provide the inverter output command voltage value which has been automatically compensated according to a change in the input voltage selectively to the inverter, or the user can provide the inverter output command voltage value which has been compensated with the manually set boost voltage to the inverter.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for controlling an inverter comprising:
an inverter for converting an inputted DC voltage into an AC output voltage for driving a motor and providing it;
an input voltage detector for detecting the DC input voltage inputted to the inverter;
an output voltage ratio computing unit for determining a ratio of an output voltage value to the detected DC input voltage value by calculating a ratio of an output command frequency to a reference frequency;
a reference voltage generator for providing a reference voltage value depending on a predetermined motor rated voltage value;
a difference voltage computing unit for calculating a difference value between the reference voltage value provided by the reference voltage generator and the DC input voltage value provided by the input voltage detector, and providing it;
a compensation voltage computing unit for obtaining a compensation voltage value by multiplying the ratio provided by the output voltage ratio computing unit to the difference voltage value provided by the difference voltage computing unit, obtaining a final compensation voltage value by adding the obtained compensation voltage value to the DC input voltage value provided from the input voltage detector, and providing it; and
the inverter for outputting an output voltage of the final compensation voltage value provided from the compensation voltage computing unit to the motor.

2. An apparatus for controlling an inverter comprising:
an inverter for converting an inputted DC voltage into an AC output voltage for driving a motor and providing it;
an input voltage detector for detecting the DC input voltage inputted to the inverter;
an output voltage ratio computing unit for calculating a ratio of an output command frequency to a reference frequency, and determining a ratio of an output voltage value to the detected DC input voltage value;
a first compensation voltage computing unit for obtaining a first compensation voltage value by adding a predetermined boost voltage value to a voltage value obtained by multiplying a ratio provided by the output voltage ratio computing unit to the DC input voltage value provided by the input voltage detector, and providing the first compensation voltage value;
a reference voltage generator for providing a reference voltage value depending on a predetermined motor rated voltage value; a difference voltage computing unit for calculating a difference value between the reference voltage value provided by the reference voltage generator and the DC input voltage value provided by the input voltage detector, and providing it;
a second compensation voltage computing unit for obtaining a compensation voltage value by multiplying the ratio provided by the output voltage ratio computing unit to the difference voltage value provided by the difference voltage computing unit, obtaining a second compensation voltage value by adding the obtained compensation voltage value to the DC input voltage value provided from the input voltage detector, and providing it;
a compensation voltage selector for selectively providing the first compensation voltage value provided from the first compensation voltage computing unit and the second compensation voltage value provided from the second compensation voltage computing unit to the inverter according to setting of a predetermined selection; and
the inverter for outputting an output voltage of the first compensation voltage value or an output voltage of the second compensation voltage value provided from the compensation voltage selector, to the motor.

3. A method for controlling an inverter comprising:
detecting a DC input voltage value of an inverter;
calculating a ratio of an output command frequency to a reference frequency and determining a ratio of an output voltage value to the detected DC input voltage value;
generating a reference voltage depending on a predetermined motor rated voltage value;
calculating a difference value between the calculated reference voltage and the DC input voltage value;
obtaining a compensation voltage value by multiplying the determined DC input voltage value to the calculated difference value, and adding the obtained compensation voltage value to the DC input voltage value to obtain a final compensation voltage value; and
providing an output voltage of the final compensation voltage value to the motor.

4. A method for controlling an inverter comprising:
detecting a DC input voltage value of an inverter;
calculating a ratio of an output command frequency to a reference frequency and determining a ratio of an output voltage value to the detected DC input voltage value;
multiplying a ratio of the output voltage value to the determined DC input voltage value, to the DC input voltage value, to obtain a value, to which a predetermined boost voltage value is added to obtain a first compensation voltage value;
generating a reference voltage depending on a predetermined motor rated voltage value;
calculating a difference value between the generated reference voltage and the DC input voltage value;
obtaining a compensation voltage value by multiplying a ratio of an output voltage value to the determined DC input voltage value to the calculated difference value, and adding the obtained compensation voltage value to the DC input voltage value to obtain a second compensation voltage value; and providing an output voltage of the first compensation voltage value or an output voltage of the second compensation voltage value to a motor according to setting of a predetermined selection.

* * * * *